United States Patent [19]

Pike

[11] 4,361,115
[45] Nov. 30, 1982

[54] HORSE EXERCISER

[76] Inventor: Wendell A. Pike, Birch Ave., Norway, Me. 04268

[21] Appl. No.: 207,355

[22] Filed: Nov. 17, 1980

[51] Int. Cl.³ .............................................. A01K 15/02
[52] U.S. Cl. ........................................ 119/29; 272/69
[58] Field of Search ........................... 119/29; 272/69; 198/772, 841

[56] References Cited

U.S. PATENT DOCUMENTS

| 2,969,870 | 1/1961 | Pulver | 198/841 |
| 3,689,066 | 9/1972 | Hagen | 272/69 |
| 3,946,856 | 3/1976 | Herrera | 198/841 X |
| 4,008,801 | 2/1977 | Reilly et al. | 198/841 |
| 4,095,561 | 6/1978 | Ruetenik | 119/29 |

FOREIGN PATENT DOCUMENTS 2503118 4/1976 Fed. Rep. of Germany ........ 272/69
525227 8/1940 United Kingdom .................. 119/29

Primary Examiner—Gene Mancene
Assistant Examiner—Robert P. Swiatek
Attorney, Agent, or Firm—Auslander, Thomas & Morrison

[57] ABSTRACT

The bottoms of transverse slats making up the upper run of a treadmill of a horse exerciser slide along the flat upper surfaces of a plurality of longitudinal support rails to provide a stable surface for the hooves of a horse being exercised. The transverse slats are affixed to links of two roller chains which are guided by and/or driven by sprockets. Each transverse slat includes an upper surface of wear-resistant resilient material which permits use of the exerciser by horses shod with shoes having winter calks.

7 Claims, 8 Drawing Figures

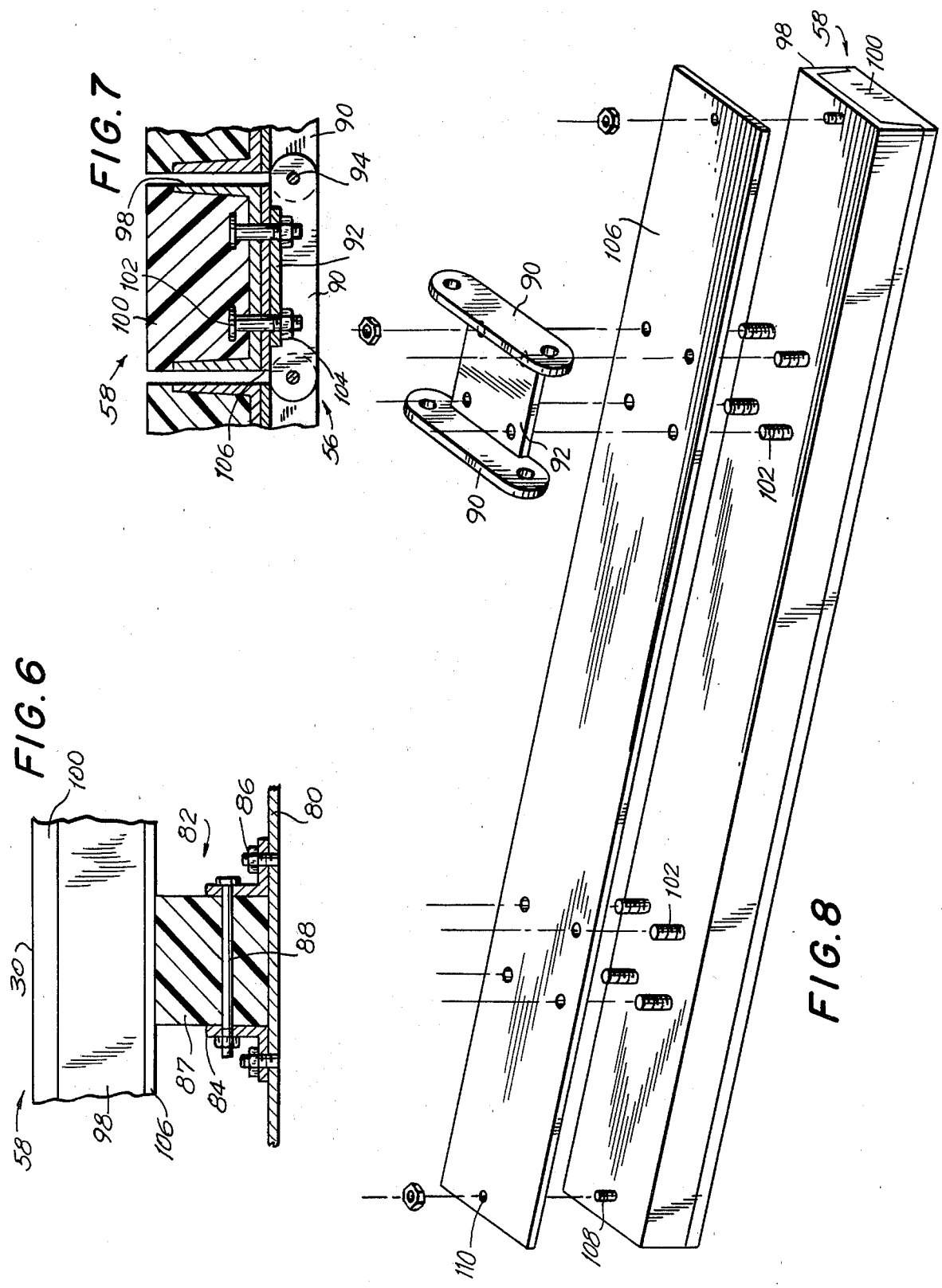

HORSE EXERCISER

BACKGROUND OF THE INVENTION

It is desirable to have a means for exercising horses under circumstances where it would not be practical to provide such exercise. This is especially true for horses in northern climates in the winter when opportunities for exercise are relatively limited.

Horse exercisers have been developed which employ a generally flat belt of rubberized fabric or the like which is held in tension between a pair of smooth rollers to form an upper and a lower run. The upper run of the belt is supported by a plurality of parallel transverse rollers which hold the upper run in a substantially planar configuration. One of the smooth rollers is driven by a motor to cause the horse on the upper run to engage in exercise.

A horse exerciser as above described has a number of drawbacks which will be dealt with in the following paragraphs.

A flat belt conveyor running on smooth rollers tends to move from side to side on these smooth rollers. This provides a relatively unstable surface for the horse to negotiate.

In the winter, horses are usually shod with shoes having projecting winter calks for piercing ice on a roadway to prevent slipping. Such winter calks can so rapidly destroy a conveyor belt that exercising a horse wearing calks is impractical.

The upper run of conveyor belting supported by parallel transverse rollers imparts a ripple or fore-and-aft wobbling angular motion to the horse's hoof as it is drawn back by the conveyor belt. This can lead to ankle separation.

Flat conveyor belts are also subject to changes with moisture and temperature which may require frequent adjustment.

Since horse exercisers are typically used in rural areas where three phase power may not be available, the ability to power such devices from single-phase power is desirable.

OBJECTS AND SUMMARY OF THE INVENTION

Accordingly, it is an object of the present invention to provide a horse exerciser which overcomes drawbacks of the prior art.

It is a further object of the invention to provide a horse exerciser which may be used outdoors and which provides a stable moving platform without ripple.

It is a further object of the invention to provide a horse exerciser which permits exercising of horses shod with winter calks.

According to an aspect of the invention there is provided an animal exerciser comprising a conveyor belt having an upper run and a lower run, means for driving the conveyor belt, the conveyor belt being formed of transverse substantially rigid slats linked together, a wear-resistant resilient outer surface on the slats and means for stably supporting the slats in a substantial portion of the upper run.

The above, and other objects, features and advantages of the present invention, will become apparent from the following description read in conjunction with the accompany drawings, in which like reference numerals designate the same elements.

BRIEF DESCRIPTION OF THE DRAWINGS

FIG. 6 is a cross section of a support rail of FIG. 5.

FIG. 7 is a cross section of a portion of the transverse slats making up an upper run of the treadmill of FIG. 3.

FIG. 8 is a bottom view of a transverse slat disassembled from its wear-resistant plate and a link of roller chain to illustrate the manner in which these parts are assembled.

DETAILED DESCRIPTION OF THE PREFERRED EMBODIMENTS

Figure 3:
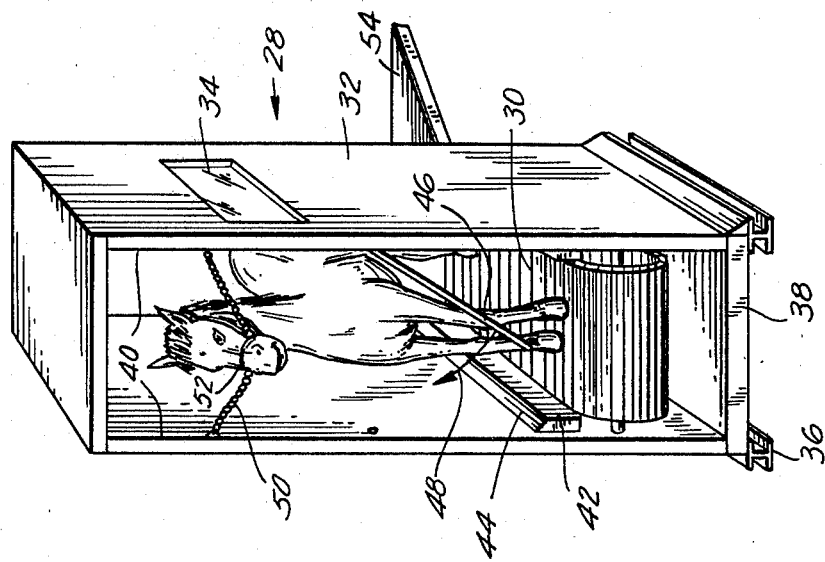
FIG. 3 is a perspective view of a horse exerciser according to an embodiment of the present invention.
Figure 1:
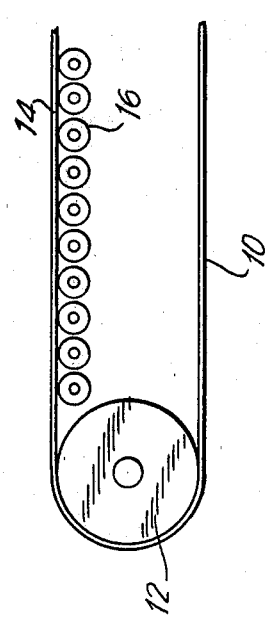
FIG. 1 is a cross section of a conveyor belt employed in a horse exerciser according to the prior art.
Figure 2:
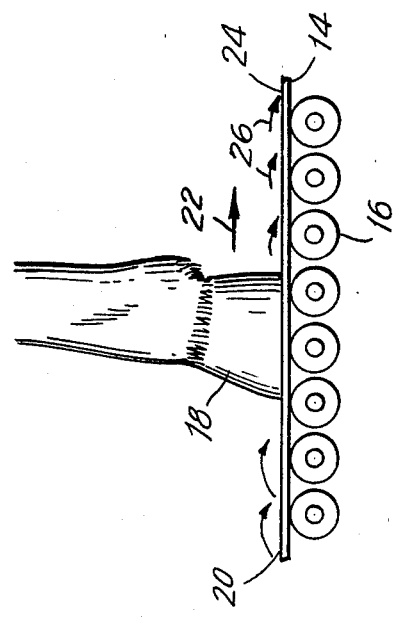
FIG. 2 is an enlarged view of a portion of the conveyor belt of FIG. 1.

Before describing the present invention in detail, a short discussion is presented with reference to FIGS. 1 and 2 to illustrate one of several problems which occurs in apparatus according to the prior art.

An endless belt 10 passes over and around a pair of rollers 12 (only one roller is shown). Drive means (not shown) may be employed to drive one or both of rollers 12 to move belt 10 at a selected predetermined speed. An upper run 14 of belt 10 is supported substantially planar by a plurality of support rollers 16.

When a horse is exercised on the apparatus of FIG. 1, when one of its hooves 18 (FIG. 2) is placed on upper run 14, it contacts upper run 14 at a point 20 and travels backward in the direction shown by an arrow 22 until it leaves upper run 14 at a point 24. As hoof 18 passes over individual ones of rollers 16, it is wobbled back and forth as indicated by curved arrows 26. Such wobbling or ripple effect produces ankle separation in the joints of horses and thus reduces the usefulness of a horse exerciser according to FIGS. 1 and 2.

A horse exerciser according to the present invention, shown generally at 28, includes a treadmill 30, to be described in greater detail hereinafter which may optionally be enclosed in a weather resisting cabin 32 which may conveniently have a viewing window 34 therein. In order to provide adequate ventilation, one or both ends of cabin 32 may be left open.

Horse exerciser 28 is built up on a frame, preferably of steel and most preferably of shaped steel sections such as, for example, I-beam longitudinal members 36 resting on the floor or ground, I-beam cross members 38 and angle or I-beam vertical members 40. Longitudinal kick panels 42 having angled top surfaces 44 at either side of treadmill 30 both protect the walls of cabin 32 from impact by hooves and also guide the hooves back on to the treadmill 30.

A chest bar 46 may be swung up in the direction of an arrow 48 and latched across the open end of cabin 32 to restrain the horse from forward travel. In addition, halter chains 50 may be connected between vertical members 40 on each side to a halter 52.

A loading ramp 54 may be provided at one or both ends for loading the horse in the exerciser.

Figure 4:
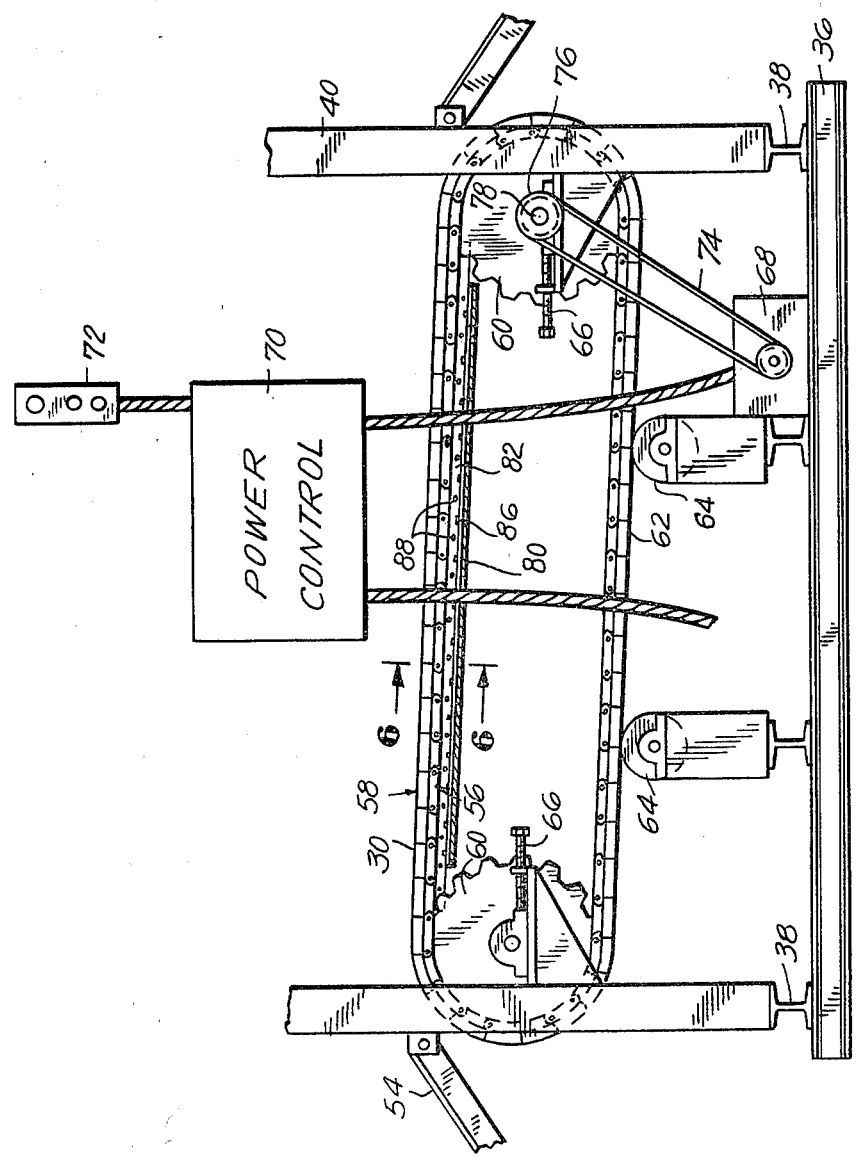
FIG. 4 is a side view of the horse exerciser of FIG. 3 with the cabin removed to reveal internal components.

Referring now to FIG. 4, treadmill 30 consists of a pair of roller chains 56 (only one of which is shown in FIG. 4) to which transverse slats 58 are affixed. As is conventional, roller chain 56 includes spaced-apart transverse rollers (not shown) which fit in, and are driven by sprockets 60 at each end thereof.

A lower run 62 of treadmill 30 may be supported at one or more places by rollers 64 to prevent excessive sag.

Tensioning members 66 may be employed to apply a selected amount of tension to treadmill 30 by moving sprockets 60 in a longitudinal direction.

A controllable speed drive motor 68, whose speed is controlled by electricity fed through a power control 70 having a control switch panel 72 affixed thereto drives a power transmitting means such as, for example, a V-belt 74 which engages a sheave 76 on an axis 78 of one of sprockets 60.

Both of sprockets 60 at one end of treadmill 30 are rigidly affixed to axis 78 whereby these sprockets 60 are maintained rotationally aligned at all times.

A transverse floor 80 extends most of the longitudinal distance between sprockets 60 and supports a plurality of support rails 82 (only one of which is shown in FIG. 4). As will become clear hereinafter, support rails 82 contact the underside of transverse slats 58 to provide a stable level surface along which the upper run of treadmill 30 may slide.

Figure 5:
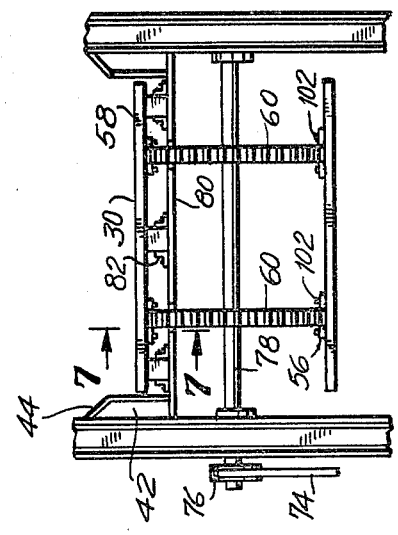
FIG. 5 is a close up end view of the horse exerciser of FIG. 3 with a portion of the conveyor belt removed to reveal other parts of the apparatus.

Referring now to FIG. 5 in which the slats 58 and roller chain 56 encircling sprockets 60 have been removed for clarity, it is seen that three support rails 82, one disposed between sprockets 60 and one each outside opposed sides of sprockets 60 are supported on transverse floor 80. Thus, transverse slats 58 in the upper run of treadmill 30 are supported at three places across their transverse dimensions and thus provide stable support for a horse's hoof.

Referring now to FIG. 6, support rail 82 is seen to consist of a pair of angle irons 84 affixed to transverse floor 80 by any suitable means such as, for example, bolts 86. A wear member 87, which may be of any convenient material such as, for example, wood, steel, synthetic rubber or plastic is affixed between opposed flanges of angle irons 84 by any convenient means such as by through bolts 88.

Referring now to FIG. 7, roller chain 56 is seen to include a plurality of links 90 having transverse tabs 92 integrally affixed thereto. Each link 90 is pivotably attached to adjacent links by an axis 94. Each axis also rotatably supports a roller which fits into notches in sprockets 60 (FIG. 4).

Transverse slats 58 are each seen to consist of a metallic U-shaped channel 98 preferably of steel having a wear-resistant resilient material 100 molded therein. Wear-resistant resilient material 100 may be of any convenient formulation capable of supporting a horse and resisting damage from horse shoes and, particularly, from horse shoes having winter calks affixed therein. In the preferred embodiment, material 100 is a synthetic rubber such as used for making automobile tires.

It is desirable that wear-resistant material 100 extend above U-shaped channel 98. This can be readily accomplished by placing U-shaped channel 98 in a form and pouring in wear-resistant material 100 to a level higher than the top of U-shaped channel 98. After curing, wear-resistant material 100 retains the shape shown in FIG. 7. A textured anti-skid pattern may be applied to the top of wear-resistant material 100 for improved resistance to slipping.

A plurality of fastening means such as, for example, bolts 102 are preferably positioned in U-shaped channel 98 prior to molding wear-resistant material 100. Bolt 102 passes through U-shaped channel 98 and tab 92 of link 90. A nut 104 may be employed on each bolt 102 to secure transverse slat 58 to link 90.

A wear-resistant plate 106 may be positioned between U-shaped channel 98 and tab 92 to thus be secured by bolt 102. Wear-resistant plate 106 extends substantially the entire length of U-shaped channel 98 and provides a surface against which support rails 82 (FIG. 5) bear. Wear-resistant plate 106 may be of any convenient material having requisite wear-resistant properties.

Referring now to FIG. 8, the underside of the transverse slat 58 is shown with bolts 102 protruding therefrom in sets of four as required to pass through the four holes in the tab 92 of a link 90. Wear-resistant plate 106 is seen to also include two sets of four holes for matching the pattern of bolts 102. In addition, an end bolt 108 is bolted into each end of transverse slat 58 and passes through a matching hole 110 in wear-resistant plate 106.

Referring again to FIG. 4, drive motor 68 may be any convenient ac or dc motor capable of driving treadmill at convenient speeds. However, there is a tendency for a horse on a treadmill to attempt to move faster than the selected speed. Motor 68 preferably has the capability of resisting the attempt of a horse to overrun the selected speed. This may be accomplished, for example, by employing a dc motor with a separately excited field having sufficient horsepower not only to drive treadmill 30 but also to apply sufficient regenerative braking in the event of an attempt by the horse to overrun the selected speed to maintain the speeds substantially at the selected value. Primary power fed to power control 70 may be either ac or dc. In the event that the primary power fed to power control 70 is ac, conventional rectifier circuits in power control 70 may be employed to produce dc power from it which is then selectively applied under control of control switch panel 72 to drive motor 68.

The applicant has discovered that a dc motor of about five horsepower is satisfactory for resisting attempts to overrun treadmill 30. The use of a dc supply also permits employment of a source of 110 or 220 vac single phase power.

Having described specific embodiments of the invention with respect to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A horse exerciser comprising:
a conveyor belt having an upper run and a lower run;
means for driving said conveyor belt;
said conveyor belt being formed of transverse substantially rigid slats linked together;
each of said slats being a U-shaped steel channel extending substantially the entire transverse dimension of said slats with the opening of the U facing upward in the upper run;
a rubber material molded to fill said opening in said U-shaped steel channel and to project a substantial distance thereabove thereby to provide a resilient outer surface on said slat whereby said slats provide stable footing for said horse and provide resistance to damage from hooves of said horse; and means for stably supporting said slats in a substantial portion of said upper run.

2. A horse exerciser according to claim 1 wherein said conveyor belt further includes two parallel runs of roller chain having links, each of said transverse slats being affixed to one link of each of said two runs of roller chain, said means for driving includes two pairs of sprockets.

3. A horse exerciser according to claim 2 wherein said means for driving is effective to prevent overrun by an animal.

4. A horse exerciser according to claim 1 wherein said means for stably supporting includes a plurality of parallel longitudinal support rails having substantially flat upper surfaces contacting an underside of said transverse slats in said upper run.

5. A horse exerciser according to claim 4 wherein at least said upper surfaces of said support rails are polyurethane.

6. A horse exerciser according to claim 4 wherein said slats have substantially flat bottoms contacting said upper surfaces and said flat bottoms include a wear plate.

7. A horse exerciser comprising:
a frame;
a floor in said frame;
first and second pairs of spaced-apart aligned sprockets in said frame;
first and second parallel endless runs of roller chain consisting of hingeably connected links;
each run of roller chain engaging one sprocket of each of said pairs of sprockets;
a plurality of substantially contiguous parallel transverse slats, each of said slats being affixed to a corresponding link in each of said two runs of roller chain, said slats forming an upper and a lower run of a conveyor belt;
each of said slats being a U-shaped steel channel extending substantially the entire transverse dimension of said slats with the opening of the U facing upward in the upper run;
a rubber material molded to fill said opening in said U-shaped steel channel and to project a substantial distance thereabove thereby to provide a resilient outer surface on said slat whereby said slats provide stable footing for said horse and provide resistance to damage from hooves of said horse;
first, second and third longitudinal support rails on said floor each having a substantially flat upper surface contacting and supporting an underside of said slats in a substantial portion of said upper run;
said second longitudinal support rail being disposed midway between said first and second runs of roller chain;
said first and third longitudinal support rails being disposed on opposite sides outside said first and second runs of roller chain; and
means for driving at least one of said pairs of sprockets.

* * * * *